(12) United States Patent
Jarville et al.

(10) Patent No.: US 8,977,678 B2
(45) Date of Patent: Mar. 10, 2015

(54) SYSTEM AND METHOD FOR CONDUCTING SURVEYS ON DEVICES WITHOUT REQUIRING PERSISTENT NETWORK CONNECTIVITY

(75) Inventors: Dominic Jarville, Middlesex (GB); Art Stivison, Dallas, TX (US)

(73) Assignee: Research Now Group, Inc., Plano, TX (US)

( * ) Notice: Subject to any disclaimer, the term of this patent is extended or adjusted under 35 U.S.C. 154(b) by 324 days.

(21) Appl. No.: 13/068,107

(22) Filed: May 2, 2011

(65) Prior Publication Data
US 2012/0284324 A1 Nov. 8, 2012

(51) Int. Cl.
*G06F 15/16* (2006.01)
*G06Q 30/02* (2012.01)

(52) U.S. Cl.
CPC .................................. *G06Q 30/0201* (2013.01)
USPC ........... 709/203; 709/201; 709/202; 709/217; 709/219

(58) Field of Classification Search
CPC ........................... G06Q 30/0201; G06Q 30/02
USPC ........................... 709/201, 202, 203, 217, 219
See application file for complete search history.

(56) References Cited

U.S. PATENT DOCUMENTS

| | | | | |
|---|---|---|---|---|
| 7,715,868 | B2 * | 5/2010 | Zhao et al. | 455/550.1 |
| 2004/0252816 | A1 | 12/2004 | Nicolas | |
| 2006/0257839 | A1 * | 11/2006 | Miyaji et al. | 434/323 |
| 2008/0056226 | A1 * | 3/2008 | Zhao et al. | 370/342 |
| 2008/0059582 | A1 * | 3/2008 | Hartikainen et al. | 709/204 |
| 2008/0119131 | A1 * | 5/2008 | Rao | 455/3.04 |
| 2008/0119134 | A1 * | 5/2008 | Rao | 455/3.05 |
| 2008/0214162 | A1 * | 9/2008 | Ramer et al. | 455/414.2 |
| 2009/0193130 | A1 * | 7/2009 | Fiatal | 709/229 |
| 2009/0287920 | A1 * | 11/2009 | Fernandez et al. | 713/151 |
| 2009/0299812 | A1 * | 12/2009 | Ray | 705/9 |
| 2010/0281355 | A1 * | 11/2010 | White et al. | 715/222 |
| 2011/0176426 | A1 * | 7/2011 | Lioy et al. | 370/241 |
| 2012/0149348 | A1 * | 6/2012 | Patel et al. | 455/416 |
| 2012/0282582 | A1 * | 11/2012 | Rao | 434/238 |
| 2012/0284324 | A1 * | 11/2012 | Jarville et al. | 709/203 |

OTHER PUBLICATIONS

International Search Report and Written Opinion issued for PCT/US2012/036149, dated Aug. 3, 2012; 9 pages.

* cited by examiner

*Primary Examiner* — Richard G Keehn
*Assistant Examiner* — Mohammed Ahmed
(74) *Attorney, Agent, or Firm* — Jonathan M. Pierce; Porter Hedges LLP

(57) ABSTRACT

Systems and methods are disclosed for conducting surveys of panelists via mobile devices without requiring persistent network connectivity with the mobile devices. A survey application is downloaded to a user's processor-based device, and executes locally on the device. A survey definition file is generated that specifies various information defining a given survey, such as specific questions to be asked, etc. The survey definition file is downloaded to the user's device. Once downloaded to the user's processor-based device, the survey definition file is interpreted by the survey application executing on the user's processor-based device in order to present a user interface on the user's processor-based device with which a user can interact to take the survey, as defined by the downloaded survey definition file. The survey definition file may be generated by a tool as a result of processing a predefined survey definition file.

18 Claims, 5 Drawing Sheets

SYSTEM AND METHOD FOR CONDUCTING SURVEYS ON DEVICES WITHOUT REQUIRING PERSISTENT NETWORK CONNECTIVITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The following description relates generally to gathering data from users of devices, and more particularly to systems and methods for conducting surveys of panelists via devices, such as mobile devices, without requiring persistent network connectivity.

BACKGROUND

Surveys are important tools for gaining information about a target audience. By surveying a target audience one may learn preferences, viewpoints, opinions, likes and/or dislikes, and/or other information regarding various subjects, such as products, services, political candidates, etc. For a given survey, the target audience to be invited to participate in the survey may be selected randomly or based on certain characteristics they possess, such as their demographics (age, geographic location, family status, etc.), interests, their use or familiarity with a given subject (e.g., certain products, services, etc.), and/or other characteristics. The members of a target audience who participate in a given survey may be referred to generally herein as "panelists." In some instances, incentives or rewards are offered to target audience members to encourage their participation in the survey. Surveys generally present questions to members of the target audience (or "panelists"), and the members' responses are recorded for analysis. The members may be logically grouped in various ways, such as based on certain characteristics of the members like gender, age, education level, geographic location, etc. Thus, surveys may enable insight to be gained regarding the views/opinions of the various members of a target audience.

The questions desired to be presented in a survey are often authored or scripted so that a human user and/or computer can then interact with panelists in conducting the survey in accordance with the scripted survey. The script generally is a programmatic description of the questionnaire and each of its elements and their attributes.

As used herein, a "survey definition" is used generally as a term to describe the script of a survey. The survey definition may specify various characteristics of a given survey. For instance, the survey definition generally specifies the set of questions to be asked for a given survey. The survey definition may further specify the types of responses/answers that are available to the panelist, such as whether the panelist is to answer a question as either "yes" or "no," whether the panelist is to select an answer from a multiple choices that are presented to the panelist, or whether the panelist is to answer the question by ranking a subject along some scale (such as on a scale from 0-10), as examples. The survey definition may further specify a flow (e.g., sometimes referred to as branching or routing), which defines not only questions to be asked but a particular sequence in which the questions are to be asked and/or a particular dependency or hierarchical relationship among the questions and/or the answers. For example, such a flow may specify that if a panelist's response to question 1 is A, then ask question 2; otherwise, ask question 3, etc. The survey definition may specify such characteristics of a given survey as: the question text (e.g., the specific set of questions to be asked for a given survey), response text (e.g., the specific answers that may be presented for selection in response to a question), response code, maximum/minimum responses, question type, fixed position of responses, randomization, rotation of responses, instructions, formatting, language in which the questions/answers are to be presented (e.g., English, French, etc.), and/or alternative language text that is available for presenting the questions/answers, etc.

Various mechanisms have been used for interacting with panelists for conducting surveys. One approach is telephone-based surveys. In employing a telephone-based survey, the survey is often scripted (e.g., in Unix or some other software-based language), as discussed above. In other words, the survey definition may be implemented in a computer-executable software program that executes on a computer with which an operator interacts, whereby the program directs the operator in conducting the survey in accordance with the survey definition. In one implementation of a telephone-based survey, outbound calls are generated (either manually by a human operator or automatically via an automatic dialer) to a target audience, or members of the target audience are somehow prompted (called to action) to call in to a telephone-based survey. Once a call is established between a human operator and the panelist taking the survey (either as a result of the panelist being called by or calling in to the telephone-based survey), the human operator may interact with the panelist to conduct the survey. In conducting the survey, the operator may interact with a computer interface to read questions off the computer screen. The operator may further interact with the computer interface to input the panelist's responses to the computer, and the software executing on the computer may present the questions to be asked by the operator in accordance with the flow defined by the survey definition (e.g., the next question that the software prompts the operator to ask may depend on the panelist's response to one or more previous questions). The responses of the panelist that are input to the computer by the operator are typically stored to a computer-readable data storage medium for later analysis.

Alternatively, instead of a human operator conducting the survey, a telephone-based survey may be implemented in a manner that does not require a human operator to interact with a panelist. For instance, the computer implemented on the researcher/surveyor's side may be implemented to output audio for effectively reading recorded questions to the panelist, and the computer may employ an interactive voice response ("IVR") system to receive voice or touch-tone (e.g., dual-tone multi-frequency, "DTMF") signals from the panelist and process the received responses autonomously for conducting the survey. Again, the computer may control the IVR system to conduct the survey in accordance with the survey definition file for the given survey, such as presenting the questions in accordance with a flow specified by the survey definition file. In other words, the survey definition may be implemented in a computer-executable software program that executes on a computer of the telephone-based surveyor, whereby the program directs the IVR system in conducting the survey in accordance with the survey definition. Also, the responses (voice or touch-tone input) received from the panelist may be stored to a computer-readable data storage medium for later analysis.

Another approach for conducting surveys has been through online web-based surveys (or "online panels"). In general, panels are an approach to sampling and maintaining contact lists for research by any channel, and such panels have evolved to be implemented online via web-based surveys. When conducting a web-based survey, panelists access and conduct a survey via the Internet, such as through a particular website. A web server hosts a website that presents a user interface to each panelist's web browser that accesses the website. In some implementations, a survey engine resides on a web server (e.g., within a web page) and uses the survey definition to describe how questions are implemented. The survey engine parses the definition file to generate the content displayed to respondents (e.g., displayed in the respondents' respective web browsers). For example, the survey engine may parse a survey definition file to provide, via a web page accessed by a respondent's web browser, an appropriate user interface for interacting with the respondent (e.g., presenting questions and receiving input from the respondent for answering the questions). Thus, the respondent's web browser displays the parsed content provided by the survey engine in a manner similar to the way an ASP page is parsed to create HTML (with extension ".asp"). Thus, in a traditional web-based survey, each panelist interacts with a user interface via their Internet connection with the hosting web server to input responses to the questions, and those responses are recorded to a computer-readable data storage medium for later analysis.

Various survey engines that may be implemented for the above-described web-based survey implementation are known in the art, such as those commercially available from Confirmit (see e.g., www.confirmit.com), Askia, MI Pro, and Global Park, as examples. Typically, an online survey authoring tool (e.g., authoring software available from a provider, such as Confirmit, Askia, MI Pro, or Global Park, as examples) enables an online survey to be created, delivered to a target audience (e.g., presented online, such as via a website), collect data that is input by panelists taking the survey, and prepare and share detailed analysis of the results. In typical operation of a web survey, for example, the survey authoring tool allows a researcher to interact with the authoring tool (via a computer on which the authoring tool software is executing) to define a survey definition (e.g., a set of questions to be presented, as well as corresponding answer types/choices that are to be presented for each question, etc.). The authoring tool may then generate code for a web page, such as HTML and/or XML code, for conducting the survey as specified by the surveyor's input to the authoring tool. Then, when a panelist accesses the web page, the defined questions and corresponding answer types/choices are presented on the panelist's web browser so that the panelists can interact with the web page to input their responses (e.g., by clicking on the correct answer). For instance, when accessing the web page, a survey engine executing on the hosting web server may parse the survey definition file to present the questions in the web page that is displayed by the panelist's web browser and to collect input data input thereto by the panelist. The web server hosting the web page thus receives and stores the input responses as data in a database, which can be exported.

With the increasing popularity and number of mobile devices having digital data connectivity, there have been a few solutions for surveying panelists via mobile devices, such as mobile telephones, smartphones, laptop or notebook computers, electronic tablets or pads, personal data assistants ("PDAs"), etc. For example, mobile devices have been used to conduct the above-mentioned web surveys, whereby a mobile device is used by a panelist to access a website hosting a survey in the manner discussed above. For instance, mobile surveys have been conducted using wireless application protocol ("WAP"). WAP basically takes the same sort of survey style, layout and approach, and even the same tools as a web survey, and runs it as a web page that is accessible via a mobile device that has Internet connectivity. In operation, a user of a mobile device completes the survey in a browser that is running on the mobile device to access the web-based survey.

In one solution, such as with Confirmit's platform called Flex, Java-based technology may be employed by a web server to read what the client device's (e.g., mobile phone's) browser is, and if the browser is determined to be iPhone or Android or one of the mobile browsers, then a normal HTML-based or ASP.net page is loaded, which presents the survey questions on the user's mobile device. The loaded page receives the user's responses as input, and stores the responses in a database on the web server that is hosting the page.

With the above-mentioned web surveys, including those that are accessed by mobile devices, the panelist's device that is employed for accessing the survey must have a persistent Internet connection while conducting the survey. For instance, when the user moves from one page of the survey to the next, the device must have an Internet connection to be given the next question and to store the answer received for that question. Further, with traditional online web-based survey solutions, a panelist often has to start all over if he/she fails to complete the survey in a single session. For instance, if the Internet connectivity is interrupted or if the user elects to close the survey without completing it, the user often does not have an option of later resuming the survey at the point where he/she left off but instead must start from the beginning of the survey the next time he/she accesses it. This is clearly inconvenient and inefficient for the panelist/respondent, and thus often causes panelists/respondents to drop out of surveys and not complete them.

BRIEF SUMMARY

The present invention is directed generally to gathering data from users of devices, and more particularly to systems and methods for conducting surveys of panelists via devices, such as mobile devices, without requiring persistent network connectivity with the devices. In certain embodiments, a survey application (that may be downloaded to a panelist's device via a communication network) resides and executes locally on a panelist's device. Further, a survey definition file (that may be downloaded to the panelist's device via a communication network) resides locally on the panelist's device, where the locally-executing survey application is operable to interpret the survey definition file to present a user interface on the panelist's device for conducting a survey as defined by the survey definition file (e.g., for presenting the questions and answer choices, etc. as defined by the survey definition file, and for collecting the panelist's input responses). The panelist's input responses may be stored locally on the panelist's device, and once the survey is completed the response data may be uploaded, via a communication network, to a server device. If the panelist's device is not communicatively coupled to the communication network when the survey is completed, then the survey application may detect when the panelist's device is connected to the communication network (e.g., through periodically checking for a network connection) and may upload the response data at that time (e.g., as a background process on the panelist's device).

In certain embodiments, the panelist's device on which the survey application and survey definition file reside/execute may be a mobile device, such as a mobile telephone, smartphone, laptop or notebook computer, electronic tablet or pad, PDA, etc. In certain embodiments, the concepts disclosed herein may be employed for conducting surveys of panelists via handheld or Internet TVs using, for example, Android or Apple-based operating systems (OS's). Of course, while particularly advantageous and desirable for mobile devices, the concepts disclosed herein may be employed for panelist devices that are not traditionally considered as "mobile," wherein the downloadable and locally-residing/executing survey application and survey definition file enables a survey to be conducted on such devices without requiring persistent network connectivity to be maintained, as is traditionally required for web-based surveys.

According to one embodiment, a method for conducting a survey is provided where a survey definition file is generated. The survey definition file may specify various information defining a given survey, such as specific questions to be asked, specific answer types and/or choices that to presented for selection in response to a question, and/or specific survey flow (e.g., sometimes referred to as branching or routing) and/or dependent relationship between questions and/or answers. The survey definition file may be stored to a server device and is downloadable to a user's processor-based device (e.g., a mobile processor-based device). Once downloaded to the user's processor-based device, the survey definition file is interpreted by a survey application executing on the user's processor-based device in order to present a user interface on the processor-based device with which a user can interact to take the survey, as defined by the survey definition file.

In one embodiment, the survey definition file is downloaded from a server device, via a communication network, to the user's processor-based device. Further, after a user interacts with the survey application on the processor-based device to take the survey (e.g., to input his/her responses to the questions presented on the user interface), response data reflecting the user's input for the survey is uploaded from the processor-based device, via the communication network, to a server device (e.g., for later analysis).

For instance, in one embodiment, the survey application executing on the user's processor-based device interprets the downloaded survey definition file to present a user interface on the processor-based device for conducting the survey as defined by the downloaded survey definition file. Response data reflecting the user's input to the processor-based device (e.g., a mobile processor-based device) for the survey is stored locally on the processor-based device. Upon completion of the survey by the user, the survey application determines whether the user's processor-based device is communicatively connected to the communication network. When determined by the survey application that the user's processor-based device is not communicatively connected to the communication network, the survey application periodically checks whether the user's processor-based device is communicatively connected to the communication network. Then, once determined by the survey application that the user's processor-based device is communicatively connected to the communication network, the survey application uploads the response data from the user's processor-based device to the server device.

Thus, in accordance with certain embodiments, persistent connectivity of the user's processor-based device with the communication network is not required for the user to take a survey via the user's processor-based device (e.g., a mobile processor-based device). Instead, the downloaded survey definition file that resides locally on the user's processor-based device can be interpreted by a locally-executing survey application in order to present a user interface for conducting the survey (without requiring a network connection for interacting with the user of the processor-based device for conducting the survey), and the user's responses can be stored locally on the user's processor-based device for later upload to a server device once the survey is completed and network connectivity is detected.

In one embodiment, the survey definition file may be generated by a survey authoring tool, responsive to an author's input to such tool. For instance, user (e.g., author) input may be received by a survey authoring tool specifying information about a desired survey, and the survey authoring tool may then generate the survey definition file in accordance with the received information.

In another embodiment, the survey definition file may be generated by a processing tool as a result of such processing tool processing a received predefined survey definition file. That is, a processing tool (e.g., computer-executable software application executing on a processor-based device, such as a server computer) may receive as input a predefined survey definition file, and the processing tool may process the received predefined survey definition file to generate the survey definition file. The received predefined survey definition file may define a survey for a different delivery platform, other than a downloadable survey definition file for a user's processor-based device (e.g., mobile processor-based device). For example, the received predefined survey definition file may define a web-based survey to be hosted by a web server.

The processing of such predefined survey definition file by the processing tool may comprise removing certain information from the received predefined survey definition file. For instance, a survey definition file defining a web-based survey (e.g., a file containing HTML or XML code for a web page for conducting an online survey) often includes much extraneous information that may not be preferable or optimal for including in a survey definition file that is to be downloaded to a user's processor-based device (e.g., mobile processor-based device). Thus, much of such extraneous information may be removed to produce a smaller and/or otherwise more optimal file for download to the user's processor-based device.

The processing of the predefined survey definition file by the processing tool may additionally or alternatively comprise replacing certain user interface elements of the predefined survey definition file with user interface elements that are preferred for a user's processor-based device. For instance, in one embodiment, the processing tool determines whether the received predefined survey definition file specifies certain user interface elements that are not preferred for conducting a survey via a mobile processor-based device, and it replaces any determined user interface elements that are not preferred with a preferred user interface element in the survey definition file to be downloaded to a user's mobile processor-based device.

According to certain embodiments, a mobile survey application is provided that when executed by a mobile processor-based device causes the device to perform certain operations. For instance, the mobile survey application is operable to interpret a mobile survey definition file stored locally on the mobile processor-based device, and present a user interface on the mobile processor-based device for conducting a survey of a user of the mobile processor-based device as defined by the mobile survey definition file. The mobile survey application may further receive input to the user interface from the user, and store locally on the mobile processor-based device response data reflecting the received user's input for the survey. In addition, responsive to completion of the survey by the user, the mobile survey application may determine whether the mobile processor-based device is communicatively connected to a communication network. When determined that the mobile processor-based device is not communicatively connected to the communication network, the mobile processor-based device may periodically check whether the mobile processor-based device is communicatively connected to the communication network, and once determined that the mobile processor-based device is communicatively connected to the communication network, the mobile survey application uploads the response data from the mobile processor-based device to a server device.

In certain embodiments, the mobile survey application further operates to determine available surveys for which the user of the mobile processor-based device is invited to participate. For instance, a user profile that defines certain demographic and/or other information about the user may be compared against some criteria specified for a survey that defines its target audience, and those surveys for which the user's profile satisfies the target criteria may be determined. The mobile survey application may then present a user interface on the mobile processor-based device for identifying the determined available surveys, which enables the user to select any one or more of the surveys to take. Responsive to receiving user input selecting one of the determined available surveys to take, the mobile survey application then downloads a corresponding mobile survey definition file via the communication network from a server device to the mobile processor-based device, which the mobile survey application can then interpret to present a user interface on the mobile processor-based device for interacting with the user to conduct the survey.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
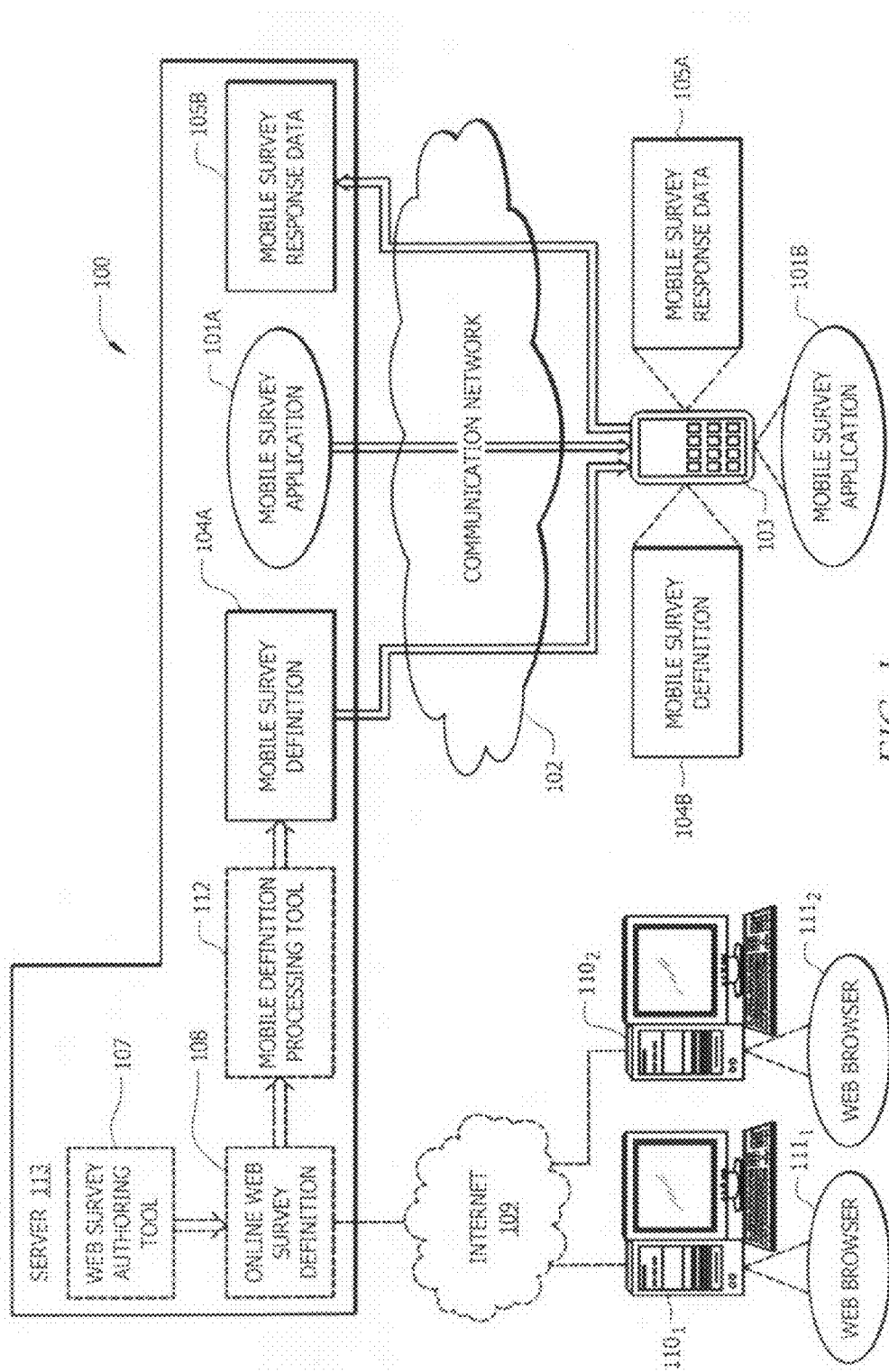
FIG. 1 shows an exemplary system according to one embodiment of the present invention.

FIG. 1 shows an exemplary system 100 according to one embodiment of the present invention. In this example, a mobile survey application 101A is available for download to a mobile device 103 via communication network 102. For instance, mobile survey application 101A may be available in an online application "store" hosted on a server (e.g., web server) for download to a mobile device 103 via communication network 102. Various types of applications, such as smartphone applications, are commonly downloaded to mobile devices, such as smartphones, and techniques for so downloading those applications to mobile devices are well known, which may likewise be employed for downloading mobile survey application 101A to mobile device 103. Once downloaded, the mobile survey application (shown in FIG. 1 as downloaded mobile survey application 101B) resides and executes locally on mobile device 103. That is, downloaded mobile survey application 101B is stored to local data storage media (e.g., flash memory or other local data storage media) of mobile device 103, and is executable by a local processor of mobile device 103.

Mobile device 103 may be any type of mobile processor-based device that is capable of communicatively connecting with communication network 102, such as mobile telephones, smartphones, laptop or notebook computers, electronic tablets or pads, personal data assistants ("PDAs"), etc. In certain embodiments, mobile device 103 is a processor-based device that is operable to wirelessly communicatively couple with communication network 102 for digital data communication, such as via WiFi, IEEE 802.11, cellular telephony communication such as 3G, 4G, or 5G connectivity, etc. In certain implementations, device 103 may not be "mobile". For instance, device 103 may not have wireless network connectivity capability. For instance, device 103 may use a fixed line network connection, such as in the case of tethering the device 103 or Internet through TV.

While a single mobile device 103 is shown for simplicity in the example of FIG. 1, it will be understood that any number of such mobile devices may be communicatively coupled with communication network 102 and thus may likewise operate to conduct surveys (for their respective users/panelists) in the manner discussed herein with mobile device 103.

Communication network 102 may be any type of network that enables data communication between processor-based devices that are communicatively coupled to such network, such as for the above-mentioned download of mobile survey application 101A from server device 113 to a processor-based mobile device 103. Communication network 102 may be a local area network (LAN), the Internet or other wide area network (WAN), private- and/or public-switched telephony network (PSTN), a wireless communication network, and/or a combination thereof. As is well-known, a number of intermediate devices, such as switches, routers, etc., may be implemented within communication network 102, and any of various different communication protocols (e.g., data communication protocols, such as IP-based and/or other packet-based communication protocols) may be employed to enable communication between processor-based devices that are communicatively coupled to such network 102.

Further, a mobile survey definition 104A is available for download to mobile device 103 via communication network 102. As described further herein, mobile survey definition 104A defines a survey to be conducted, such as by defining specific questions to be asked, specific answer types and/or choices that may be presented for selection in response to certain questions, a specific flow and/or hierarchical/dependent relationship between questions and/or answers that may be received thereto, and/or other information effectively defining how a survey is to be conducted with a user of a mobile device, such as device 103. The survey definition may, in certain embodiments, specify any one or more of such characteristics of a given survey as: the question text (e.g., the specific set of questions to be asked for a given survey), response text (e.g., the specific answers that may be presented for selection in response to a question), response code, maximum/minimum responses, question type, fixed position of responses, randomization, rotation of responses, instructions, formatting, language in which the questions/answers are to be presented (e.g., English, French, etc.), and/or alternative language text that is available for presenting the questions/answers, etc. As discussed further herein, in certain embodiments, the survey definition 104A is optimized for download to a user's mobile device.

Once downloaded, the mobile survey definition (shown in FIG. 1 as downloaded mobile survey definition 104B) resides locally on mobile device 103. That is, downloaded mobile survey definition 104B is stored to local data storage media (e.g., flash memory or other local data storage media) of mobile device 103. As described further herein, mobile survey definition 104B is a computer-readable data structure (e.g., file) that defines a survey to be conducted in a manner that can be interpreted by downloaded mobile survey application 101B, whereby mobile survey application 101B can execute on mobile device 103 for interpreting mobile survey definition 104B and presenting a user interface thereon for conducting the survey as defined by mobile survey definition 104B.

As described further herein, mobile survey application 101B can execute to interpret the downloaded mobile survey definition 104B for conducting the survey, as defined by mobile survey definition 104B. For instance, mobile survey application 101B can present a user interface on mobile device 103 for presenting the questions in the manner as defined by the mobile survey definition 104B and for receiving input responses from a user (or "panelist") via mobile device 103. The responses received from the user are stored locally to mobile device 103 as mobile survey response data 105A. That is, mobile survey response data 105A that is received from a user when interacting with a given mobile survey (as defined by a given mobile survey definition 104B) that is presented by mobile survey application 101B is stored to local data storage media (e.g., flash memory or other local data storage media) of mobile device 103. The mobile survey response data 105A is available for upload from mobile device 103 via communication network 102, and the uploaded mobile survey response data (shown in FIG. 1 as uploaded mobile survey definition 105B) may be stored remotely (relative to mobile device 103), such as on a remote server device.

As can be appreciated from the above description, the above-described mobile survey process enables a defined survey (e.g., as defined by mobile survey definition 104B) to be conducted on a mobile device 103 without requiring persistent connectivity of mobile device 103 with communication network 102, as is required with traditional online web surveys. Because mobile survey application 101B and mobile survey definition 104B are downloaded and reside/execute locally on mobile device 103, the mobile device 103 is not required to thereafter have a persistent connection with communication network 102 in order for a user of mobile device 103 to take the survey. Rather, the mobile survey application 101B may execute to conduct the survey (as defined by mobile survey definition 104B) on mobile device 103 without mobile device 103 having connectivity with network 102.

Further, the response data 105A collected from the user's input when taking the survey may be stored locally on mobile device 103, and then later uploaded as response data 105B to a remote server for further analysis at some time when mobile survey application 101B detects that mobile device 103 has connectivity with network 102. Such an upload of the response data 105A may be conducted by mobile survey application 101B as a background process that is transparent to the user of mobile device 103 (e.g., requires no further action from the user of mobile device 103 to actively initiate the upload). For instance, once a user marks a survey as complete (e.g., by clicking on a "submit" button), then the mobile survey application 101B may periodically determine whether mobile device 103 has a connection to network 102 and upon detecting such a connection may upload the mobile survey response data 105A to server 113.

In addition, in certain embodiments, mobile survey application 101B enables a user of mobile device 103 to take a portion of a survey defined by mobile survey definition 104B and then close the survey and have the capability of later resuming the survey at the point where he/she left off. For instance, in certain embodiments mobile survey application 101B is able to effectively tag a point (e.g., within mobile survey definition 104B) at which the corresponding survey being taken by a user was terminated, and when the survey is later loaded mobile survey application 101B can resume the survey at the tagged point (e.g., at the first question in the survey that has not yet been answered by the user). Similarly, the response data gathered once the survey is later resumed can be appended to (or otherwise associated with) the earlier gathered survey response data 105A by mobile survey application 101B so that the complete mobile survey response data 105A is collected/aggregated for a given survey for upload to a data storage device (e.g., server) as uploaded mobile survey response data 105B.

In certain embodiments, the mobile survey definition 104A may be generated through an author's interaction with a mobile survey authoring tool. In certain embodiments, a traditional authoring tool, such as Confirmit's web survey authoring environment, may be employed for authoring mobile survey definition file 104A. Such survey authoring tool may be a computer-executable software application that is stored to a computer-readable medium device (e.g., hard disk, ROM, RAM, flash memory device, magnetic memory device, etc.) that when executing on a processor-based device (e.g., server device 113) provides an interface with which a user may interact to author mobile survey definition 104A. Again, in certain embodiments, such an authoring environment/interface may be the same tool or similar to those provided by common web survey authoring tools, such as those provided by Confirmit.

As discussed previously herein, various web survey authoring tools, such as web survey authoring tool 107, have been available to enable an author to create an online web survey definition 108. For instance, Confirmit's web survey authoring tool enables an author to so create an online web survey definition file 108. As discussed above, the resulting online web survey definition 108 may be parsed by a survey engine for presenting a user interface via a web page that is accessible by users connected thereto over the Internet. Thus, a web page that may hosted on a web server (e.g., server 113 in the example of FIG. 1) which is accessible via the Internet 109 by computers connected thereto. For instance, computers 110$_1$ and 110$_2$ having web browsers 111$_1$ and 111$_2$ executing thereon, respectively, may access the web server 114 hosting the web page as defined by the code contained in online web survey definition 108. The web browsers 111$_1$ and 111$_2$ interpret the online web page in a traditional manner (e.g., as client web browsers traditionally interpret web pages hosted on web servers) to present the corresponding interface for conducting the online survey as defined by online web survey definition 108. Of course, in such a traditional online web survey approach, the client device (e.g., computers 110$_1$ and 110$_2$ in the example of FIG. 1) must maintain persistent network connectivity during conducting the survey in order for the user of such client device to input responses to the questions posed by the survey presented. Further, in such a traditional approach, the web survey definition file 108 is not exported or moved (e.g., downloaded) from web server 113 (e.g., from the authoring tool 107) to a client device 110.

In accordance with certain embodiments of the present invention, the survey definition file (e.g., definition file 108) is downloaded (as mobile survey 104B) to a user's device 103 to be interpreted by a locally-executing mobile survey application 101B for conducting a survey of the device's user, rather than requiring a persistent network connection via Internet 109 for accessing a web page for conducting such survey. In certain embodiments, the online web survey definition file 108 is processed to produce an optimized mobile survey definition file 104A that is optimized for download to the user's device, rather than downloading the original web-based definition file 108. For instance, in certain embodiments, mobile definition processing tool 112 is operable to receive as input the online web survey definition 108 that was authored by a traditional web survey authoring tool 107 and generate therefrom the mobile survey definition 104A. As discussed further herein, an online web survey definition is generally not optimal for download (e.g., as mobile survey definition 104A) to a mobile device 103. The traditional online web survey definition 108 generally includes much extraneous information, thereby resulting in the file being undesirably large for download to mobile device 103.

Further, the traditional online web survey definition 108 may not present the survey in an appropriate interface that is optimal for interaction with a user of mobile device 103. For instance, as discussed further herein, certain information (e.g., gender) that is displayed textually in the traditional online web survey definition 108 may be preferred to instead be presented graphically on a mobile device 103. As another example, an interface for requesting a user to rate a subject along a scale may ask a user to select one of various rating choices (e.g., 1 for dissatisfied, 2 for somewhat satisfied, 3 for satisfied, 4 for very satisfied, etc.), but a slider interface may be more preferred for use in enabling a user to input this information on a mobile device. Thus, mobile definition processing tool 112 may process the online web survey definition 108 to generate mobile survey definition 104A that is more optimal for download to and execution on mobile device 103. For instance, the mobile definition processing tool 112 may process the online web survey definition 108 to generate mobile survey definition 104A that is smaller in size than online web survey definition 108 and/or that presents more appropriate user interface and/or user interactive elements for mobile device 103.

An example of a traditional online web survey definition 108 (XML file) for a web page, as may be generated by a web survey authoring tool 107, is shown in Appendix A hereto, and an example of a resulting mobile survey definition 104A that may be generated by mobile definition processing tool 112 as a result of its processing of such definition 108 of Appendix A, in accordance with one exemplary embodiment, is shown in Appendix B hereto. As can be seen by this example, the generated mobile survey definition 104A of Appendix B is smaller and/or otherwise more optimal for a mobile survey definition to be employed on a mobile device 103. Of course, the specific code examples offered in Appendices A and B are merely examples that illustrative of one embodiment of the present invention, and the inventive concepts disclosed herein (including the operation of mobile definition processing tool 112) are not limited to the specific examples reflected in Appendices A and B.

In certain embodiments, the mobile definition processing tool 112 is operable to generate the mobile survey definition 104A autonomously (without requiring interaction with a human user). For instance, mobile definition processing tool 112 may receive as input thereto (e.g., at the direction of a user) a particular online web survey definition file 108, and is then operable to autonomously generate (without requiring further interaction with a user, such as any coding/authoring by a user) the mobile survey definition 104A.

In other embodiments, the mobile definition processing tool 112 may process the predefined online web survey definition 108, and determine certain ways in which the online web survey definition 108 may be improved or optimized in generating mobile survey definition 104A. At least some of the determined optimizations may be presented to a user so that the user can select which optimizations to employ in generating the mobile survey definition. For instance, certain interface elements within online web survey definition 108 may be identified by mobile definition processing tool as not optimal for use on many mobile devices (that may have relatively small displays and/or limited user-input capabilities). Thus, in certain embodiments, mobile definition processing tool 112 may identify those elements and recommend a different user interface element that may be employed more effectively for mobile devices.

In certain embodiments, mobile definition processing tool 112 is invoked in response to a researcher/surveyor (e.g., an author using authoring tool 107) deciding to export a survey definition as a downloadable file to a mobile device 103, or in response to a mobile survey application 101B of a mobile device 103 requesting a survey definition file to be downloaded from server 113. For instance, in certain embodiments, mobile definition processing tool 112 is implemented as a component of the web services interface implemented for mobile survey application 101B accessing the survey on server 113. Thus, in response to a mobile survey application 101B requesting a survey definition file (e.g., survey definition 108 that may be resident within tool 107 on server 113), the mobile definition processing tool 112 (which may be implemented as a component of the web services interface for interfacing server 113 with mobile survey application 101B) may process the requested survey definition 108 to generate the optimized mobile survey definition file 104A for download to mobile device 103. Of course, if no processing is required or desired (e.g., to alter/optimize the survey definition 108) in certain embodiments, then in certain embodiments survey definition 108 itself may be exported for download to mobile device 103 (in which case the generated mobile survey definition file 104A is the same as the web survey definition 108 that may be also used for a web-based survey). In either case, the downloaded mobile survey definition file 104A is stored locally to mobile device 103, shown as mobile survey definition file 104B.

Accordingly, mobile definition processing tool 112 may aid a user in generating a mobile survey definition 104A from a corresponding predefined survey definition for a different delivery platform (different than a mobile download delivery), such as for a traditional web-based survey or telephone-based survey. In so aiding the user, the mobile definition processing tool 112 may autonomously process the input predefined survey definition (e.g., online web survey definition 108 in the example of FIG. 1) and/or may interact with a user in determining certain elements of the mobile survey definition 104A to be generated. In either case, the mobile definition processing tool 112 alleviates the user from having to script/author mobile survey definition 104A (e.g., via an authoring tool 106). While shown for ease of illustration as a separate element in FIG. 1, in certain embodiments the mobile definition processing tool 112 may be integrated as part of the authoring tool 107. In typical implementations, the definition file 108 is resident within the authoring tool 107, and it may be exported to different instances of those tools 107 (e.g., as may be hosted on different web servers, etc.). In certain embodiments of the present invention, such definition file 108 (or optimized mobile survey definition file 104A) is instead exported to the user's mobile device 103 (where it is stored as downloaded mobile survey definition file 104B) for interpretation by mobile survey application 101B.

Thus, by mobile definition processing tool 112 generating an optimized mobile survey definition 104A from a traditional online web survey definition 108, this may ease the ability to generate such an optimized mobile survey definition 104A in several ways. First, if a surveyor desires to deploy both an online web survey and a mobile survey, the surveyor is not required to separately author two different survey definition files. Instead, the surveyor can simply author the traditional online web survey definition 108, and then employ mobile definition processing tool 112 to easily generate the optimized mobile survey definition 104A. Further, the surveyor is not required to learn a new authoring environment for generating an optimized mobile survey definition 104A. Instead, the surveyor may use a traditional web survey authoring tool 107 with which the surveyor may be familiar to generate online web survey definition 108, and then employ mobile definition processing tool 112 to generate the optimized mobile survey definition 104A, irrespective of whether the surveyor desires to deploy both the web survey and mobile survey or only the downloadable mobile survey.

Each of mobile survey application 101A, mobile survey definition 104A, web survey definition file 108, authoring tool 107, definition processing tool 112, and mobile survey response data 105B may be stored to one or more data storage devices that are communicatively coupled to communication network 102. For instance, each of those elements may be stored to a common or to different processor-based server devices that is/are communicatively coupled to communication network 102. Such processor-based server devices may, for example, be a web server device. In the example of FIG. 1, those elements are shown as stored to a processor-based server device 113. Of course, these elements may be stored to different processor-based server devices in certain embodiments, rather than being implemented on a common server, such as a server device 113.

The mobile survey application 101B, authoring tool 107, and definition processing tool 112 may each comprise computer-executable software code stored to a computer-readable medium device (e.g., hard disk, ROM, RAM, flash memory device, magnetic memory device, etc.) that when executing on a processor-based device (e.g., a server device 113 or a user's mobile device 103) for performing the corresponding operations described herein. For instance, mobile survey application 101B may be a computer-executable software application that is stored to and executes on a processor of device 103 for, among other things, interpreting a downloaded mobile survey definition file 104B residing on device 103 for presenting a user interface on device 103 for interacting with a user to conduct a survey as defined by the mobile survey definition file 104B. Authoring tool 107 may be a computer-executable software application that is stored to and executes on a processor of server device 113 for, among other things, providing an interface with which a user ("author") may interact to author survey definition 108, such as an authoring environment available from Confirmit. The definition processing tool 112 may be a computer-executable software application that is stored to and executes on a processor of server 113 for, among other things, processing survey definition 108 to generate an optimized mobile survey definition file 104A that is exported for download to mobile device 103. In certain embodiments, the definition processing tool 112 is implemented as a web services, such as a component part of web services interfacing the mobile survey application 101B with a researcher/surveyor's sampling system/server 113.

In certain embodiments, mobile survey application 101B may enable a user to complete a profile and/or the user may complete a user profile online (e.g., via a website). The user profile may specify certain demographic and/or other information about the user. If completed via mobile survey application 101B, the profile information may be uploaded to server 113 once a network connection is detected for mobile device 103. Thereafter, the user may be identified (e.g., by a process running on server 113), based at least in part on information from his/her profile, as a target for one or more defined mobile surveys. For instance, a given survey may be directed toward learning preferences of parents about certain baby products, and so the target audience may be defined as those persons who are parents of young children. A process executing on server 113 may determine from users' profiles those users who fit that target criteria, and may thus make the survey available to those identified users. In certain embodiments, a profiler scripted via authoring tool 107 into a survey definition 108/104A may be flagged to collect and send certain profile data back to server 113, and this data is placed into demographics and profiling systems that may be implemented on server 113. For certain surveys, there may be no profile-based requirement, where the survey is targeted for all potential respondents.

Those mobile surveys for which the user of mobile device 103 is identified as a target (e.g., based at least in part on his/her user profile, or based upon the survey being targeted to all potential respondents) may be presented (e.g., listed) by mobile survey application 101B. Mobile survey application 101B may, for example, periodically receive downloaded updates listing mobile surveys for which the user of mobile device 103 has been identified (e.g., by server 113) as a target. Thus, the user can periodically review those surveys that are available for him/her to take via mobile survey application 101B. Each survey may, in some embodiments, have a corresponding number of rewards or incentives that are identified as being available to the user if the user elects to take the survey.

For those surveys that are selected by the user, the corresponding mobile survey definition is downloaded to mobile device 103 (e.g., as with mobile survey definition 104B shown in FIG. 1), and then the user can take the downloaded survey via mobile survey application 101B. Thus, each survey has a corresponding mobile survey definition, such as mobile survey definition 104A, associated therewith that, when selected by the user, is downloaded to mobile device 103. The mobile survey application 101B executing on the mobile device 103 can interpret the downloaded mobile survey definition in the manner discussed above to present the user an interface that enables the user to take the survey via mobile device 103. The user's response data is saved locally to mobile device 103 (e.g., as with mobile survey response data 105A), and once the survey is completed and a network connection is detected by mobile survey application 101B, it uploads the mobile survey response data to server 113, and the user may be credited the corresponding rewards/incentives for completion of the survey.

Figure 2:
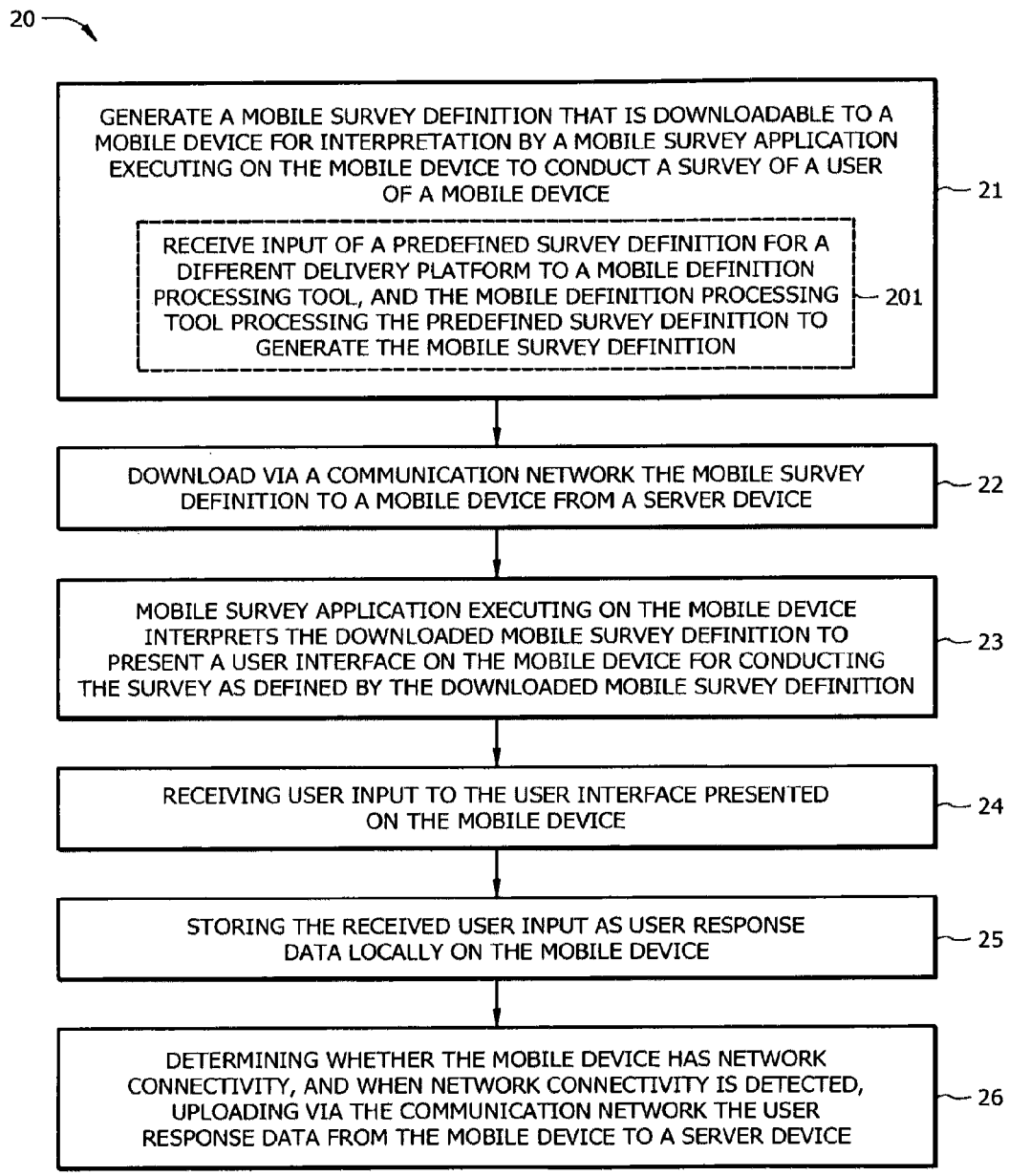
FIG. 2 shows an exemplary operational flow according to one embodiment of the present invention.

Turning to FIG. 2, an exemplary operational flow according to one embodiment is shown. In operational block 21, a mobile survey definition 104A is generated. The generated mobile survey definition 104A is downloadable to a mobile device 103 for interpretation by a mobile survey application 101B executing on the mobile device 103 to conduct a survey of a user of the mobile device 103. That is, the mobile survey application 101B is operable to interpret the downloadable mobile survey definition 104A (once it is downloaded to mobile device 103) to present a user interface on mobile device 103 for conducting a survey of the user of mobile device 103, as defined by the mobile survey definition.

As discussed further herein, the mobile survey definition 104A may be a web-based survey definition file generated by an authoring tool 107 that is exported for download to mobile device 103 instead of being presented as a web page hosted on server 113. In other words, the mobile survey definition 104A may be the same as web-based survey definition file 108, in certain embodiments. In some embodiments, the mobile survey definition 104A is generated, in optional sub-block 201, by a mobile definition processing tool 112 (e.g., web services component). In particular, the mobile definition processing tool 112 may receive input of a predefined survey definition (e.g., online web survey definition 108), which may have been predefined for a different delivery platform (e.g., web-survey, telephone-based survey, or other delivery platform other than as a download to a mobile device), and the mobile definition processing tool 112 processes the received predefined survey definition to generate the mobile survey definition 104A. In certain embodiments, this processing may be performed automatically (e.g., by a web services interface component) as part of the download process of the requested survey definition to mobile device 103.

In operational block 22, the mobile survey definition 104A is downloaded via a communication network 102 to a mobile device 103 from a server device 113. In operational block 23, a mobile survey application 101B executing on the mobile device 103 interprets the downloaded mobile survey definition 104B to present a user interface on the mobile device 103 for conducting the survey as defined by the downloaded mobile survey definition 104B.

In operational block 24, user input to the user interface that is presented on the mobile device 103 is received, and the received user input is stored locally on the mobile device 103 as user response data 105A, in operational block 25. As discussed further herein, operational blocks 23-25 may be performed without mobile device 103 being communicatively coupled with communication network 102 (e.g., mobile device 103 may be offline). In operational block 26, mobile survey application 101B determines whether the mobile device 103 has network connectivity, and when network connectivity is detected, mobile survey application 101B uploads via the communication network 102 the user response data 105A from the mobile device 103 to a server device 113.

There are certain user interface elements that may be preferred or optimal for use in presenting a survey on a mobile device 103. In certain embodiments, a survey authoring tool 107 may recognize certain types of questions or interactions that an author is desiring to be included in a mobile survey definition 104A that is being authored, and the survey authoring tool 107 may recommend/suggest or automatically implement certain preferred user interface elements for the corresponding type of question or interaction that is desired within the survey definition 108 that is being generated. In other embodiments, certain types of questions or interactions that are implemented within a predefined survey definition, such as online web survey definition 108 that may be authored by a traditional authoring environment, may be recognized by mobile definition processing tool 112 as it processes such predefined survey definition, and the mobile definition processing tool 112 may recommend/suggest or automatically implement certain preferred user interface elements for the corresponding type of question or interaction that is desired within the mobile survey definition 104A that is being generated.

Figure 3:
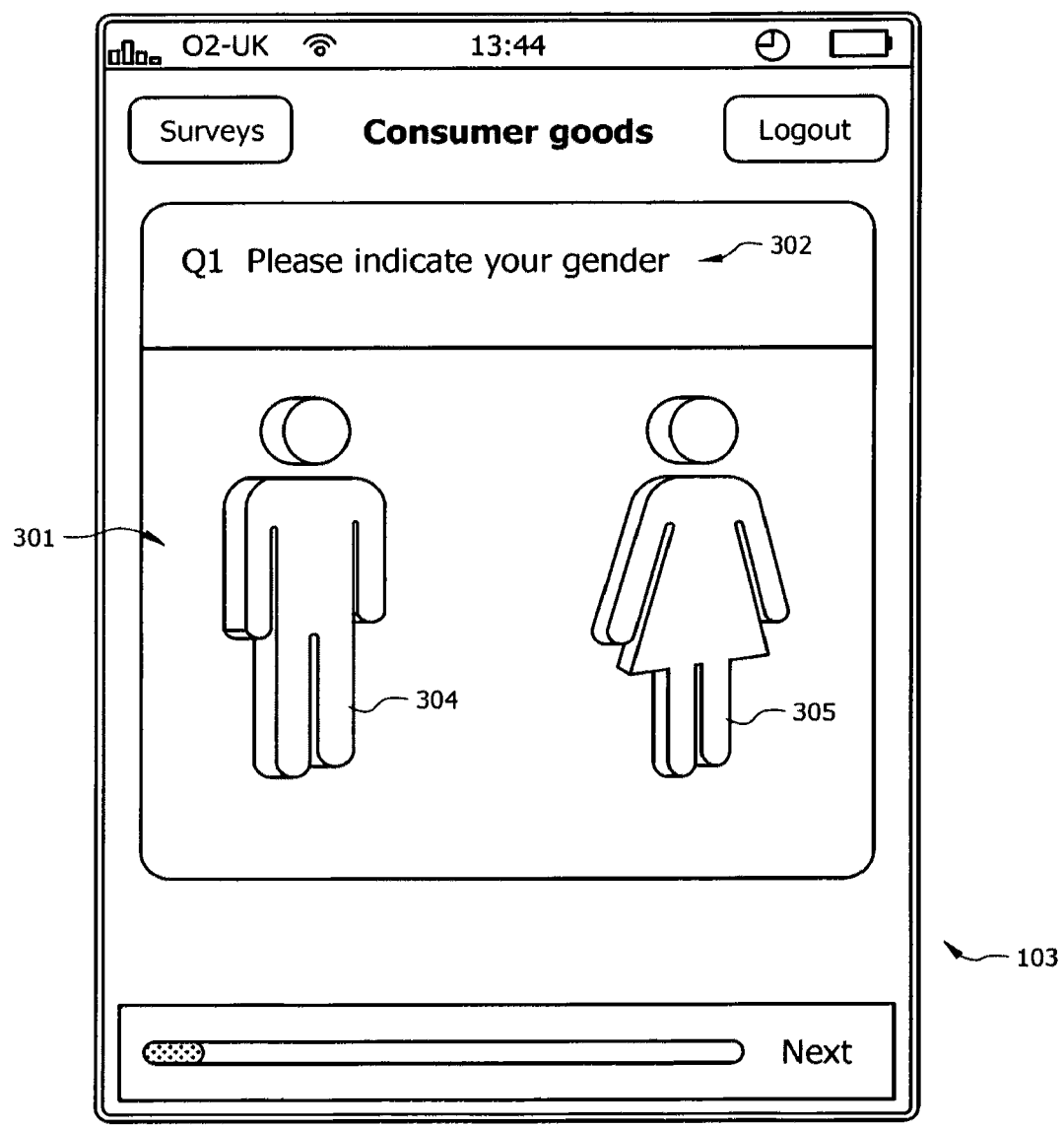
FIG. 3 shows an exemplary user interface including a graphic indication of a male and female that may be defined in a mobile survey definition for presentation by a mobile survey application in accordance with one embodiment of the present invention.

First, certain types of information may be preferred to be presented graphically (e.g., as icons, pictures, etc.) on a mobile device 103, rather than textually. Certain information that is often presented textually in a survey may instead be defined within mobile survey definition 104A/104B to be presented graphically, which may be a preferred manner of presenting such information a mobile device (e.g., to enhance the user's experience, to make better use of a mobile device's display, etc.). As one example, a gender question may be included in a survey. In certain embodiments, the mobile definition processing tool 112 and/or survey authoring tool 107 may include instructions within mobile survey definition 108/104A that are interpreted by mobile survey application 101B to cause such application 101B to show a stylized picture of a man and a woman within its user interface, instead of presenting the words "male" and "female" as mere text. As an example, the instructions included within the downloaded mobile survey definition 104B may be interpreted by mobile survey application 101B to generate an interface on mobile device 103 as shown in FIG. 3. The mobile survey application 101B may cause a question/instruction 302 to be presented on the display 301 of mobile device 103 requesting the user to indicate his/her gender, and to present as possible selections/answers a picture/icon 304 of a man and a picture/icon 305 of a woman. The user may simply select (e.g., by clicking on or touching on a touch-screen) the appropriate one of the icons 304/305.

Figure 4:
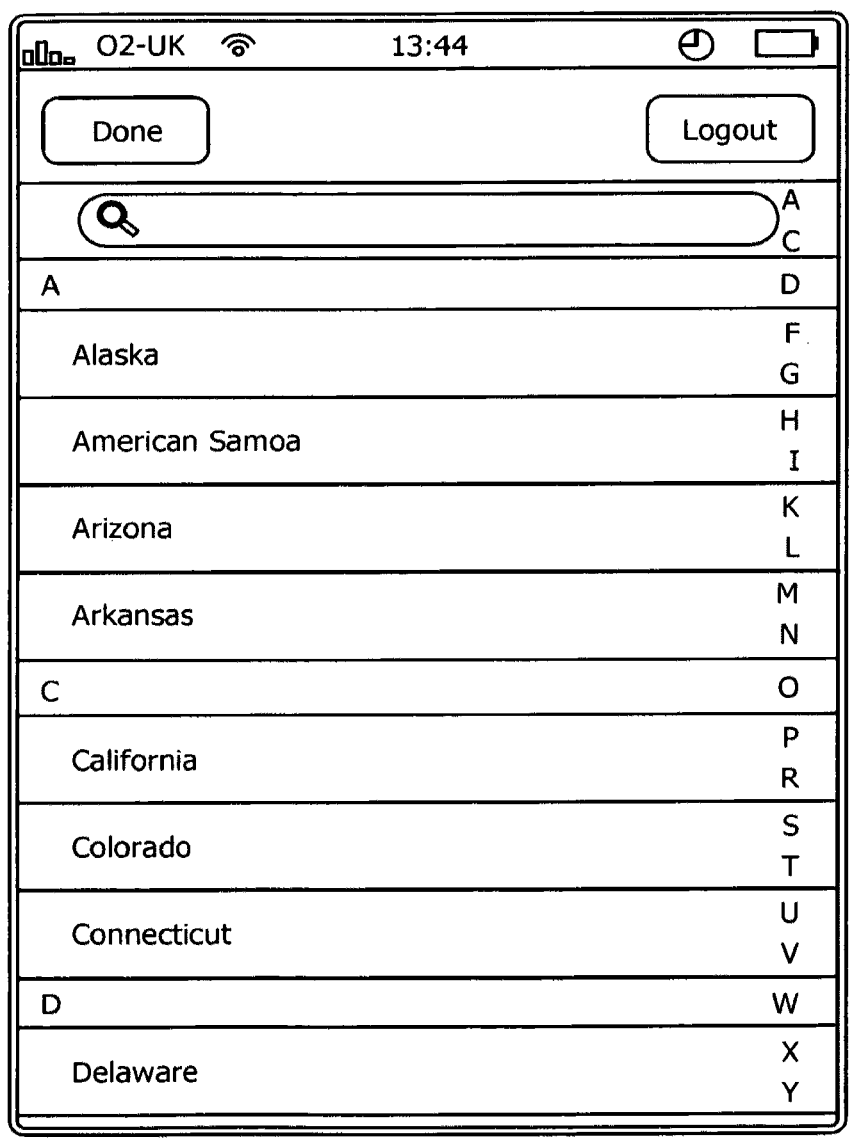
FIG. 4 shows an exemplary user interface including a listing of states that may be defined in a mobile survey definition for presentation by a mobile survey application in accordance with one embodiment of the present invention.

As another example, certain lists can be presented in an organized fashion that makes it easier for a user to jump to a desired portion of the list. For instance, a list of states may be presented in a manner that instead of requiring a user to scroll through 30 or 40 states to get to a desired state (e.g., Texas), the user can simply type T and the list box will shorten to show those states beginning with T (Tennessee and Texas). Of course, additionally a search bar may be presented that allows a user to scroll down the list of states if he or she desires. Further, an alphabetic list may be presented (e.g., down the side of the list) which may allow a user to click on a letter (e.g., "T") to jump to the portion of the list showing the states that begin with that letter. An example of such a user interface that may be presented by mobile survey application 101B on a mobile device 103 for listing states is shown in FIG. 4. Again, in certain embodiments, the mobile definition processing tool 112 and/or survey authoring tool 107 may include instructions within survey definition 108/104A that are interpreted by mobile survey application 101B to cause such application 101B to present this type of user interface element. For instance, mobile definition processing tool 112 and/or survey authoring tool 107 may recognize (from an author's input and/or from code contained in a received predefined survey definition) that a long list (e.g., of all U.S. states) is desired, and it may therefore choose to implement this type of user interface element within the mobile survey definition 104A (even though the author's input and/or the received predefined survey definition does not itself expressly define this type of user interface element for presenting the list, but may instead simply indicate that the states should be presented in a list).

Figure 5:
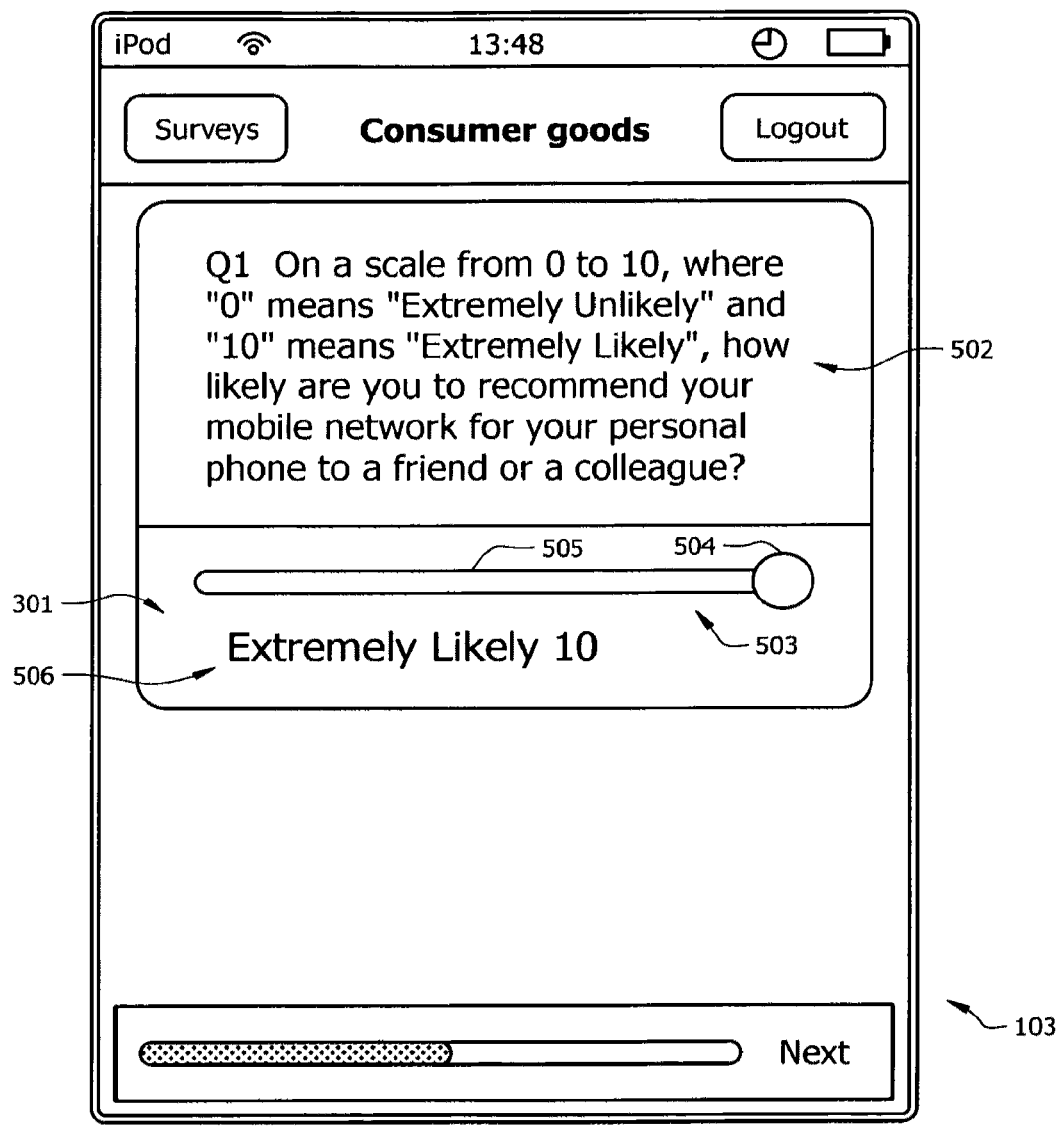
FIG. 5 shows an exemplary user interface including a slider for rating on a scale that may be defined in a mobile survey definition for presentation by a mobile survey application in accordance with one embodiment of the present invention.

A third exemplary type of user interface element that may be employed by mobile definition processing tool 112 and/or survey authoring tool 107 is a slider. For instance, if a scaled user response is desired, such as rate of a scale of 1-5 your happiness with a particular product/service, the user interface may give the user an option of 5 different choices: e.g., 1) very unhappy, 2) quite unhappy, 3) neither happy nor unhappy, 4) quite happy, and 5) very happy. Instead, this type of user interaction may be represented with a slider user interface element. For instance a slider may allow a user to move a pointer element along a reference scale to the point which coincides with the user's response. As an example, the instructions included within the downloaded mobile survey definition 104B may be interpreted by mobile survey application 101B to generate an interface on mobile device 103 as shown in FIG. 5. The mobile survey application 101B may cause a question/instruction 502 to be presented on the display 301 of mobile device 103 requesting the user to rank his/her response about some subject on a scale (e.g., from 0 to 10), and to present a slider 503 to aid the user in inputting his/her response. The slider 503 may include a pointer element 504 that a user can move along a scale 505. As the user moves the pointer element 504 along the scale 505, corresponding textual indication of the position on the scale may be presented, such as text 506. Again, in certain embodiments, the mobile definition processing tool 112 and/or survey authoring tool 106 may include instructions within survey definition 108/104A that are interpreted by mobile survey application 101B to cause such application 101B to present this slider type of user interface element. For instance, mobile definition processing tool 112 and/or survey authoring tool 107 may recognize (from an author's input and/or from code contained in a received predefined survey definition) that a ranking along some predefined scale is desired, and it may therefore choose to implement this type of user interface element within the mobile survey definition 104A (even though the author's input and/or the received predefined survey definition does not itself expressly define this slider type of user interface element for presenting the list, but may instead simply indicate that a ranking along a scale is desired and/or define a different type of user interface element, such as a textual selection list).

Further, in either the survey authoring tool 107 generating survey definition 108 from user input thereto or in the mobile definition processing tool 112 generating mobile survey definition 104A as a result of processing a predefined survey definition (e.g., an online web survey definition 108 generated by a traditional authoring tool 107), mobile survey definition 104A may be generated to not include much extraneous information that is traditionally included in an online web survey definition. For instance, an online web survey definition 108 that is commonly generated by a traditional web survey authoring tool 107 is an XML file, such as the exemplary file shown in Appendix A hereto. Much information contained in that file is not really needed or used for a downloaded mobile survey definition 104B, and therefore much of the information can be removed/trimmed from the online web survey definition by mobile definition processing tool 112 (or simply not inserted in the first place when being authored/generated by a new survey authoring tool 107 that may be implemented in accordance with embodiments of the present invention) in order to generate a mobile survey definition 104A that is more optimal/appropriate for download to a mobile device 103. For instance, the mobile survey definition 104A can thus be a smaller size for enabling a faster download and/or more efficient storage to mobile device 103 without sacrificing important functionality for the survey.

As one example, a variable for each question included in a survey may specify a plurality different languages in which the question may be presented. Of course, by generating the mobile survey definition 104A for a single language (e.g., English), the extraneous information pertaining to various other languages (e.g., French, German, etc.) can be eliminated from the definition. For instance, the traditional web-based survey definition file 108 commonly contains all possible variable values, where each question may have approximately a dozen such possible variable values most of which are not set in many cases, and hence all the empty or unset variables (e.g., in the XML coding) may be removed as extraneous information in generating an optimized mobile survey definition file 104A.

An example of a "trimmed" mobile survey definition 104A that may be generated as a result of mobile definition processing tool 112 processing the online web survey definition file of Appendix A in accordance with one embodiment is shown in Appendix B.

In view of the above, in accordance with certain embodiments, a mobile survey application 101B is provided which can execute on a mobile device 10 to conduct survey(s) of the user of the mobile device 103. In certain embodiments, the mobile survey application 101B does not require a persistent network connection to network 102 while conducting a survey. Rather, in certain embodiments, a mobile survey definition 104B that is downloaded via network 102 to the mobile device 103 is interpreted by the mobile survey application 101B to present a user interface for conducting the desired survey offline. The results of the survey may be recorded and stored to mobile device 103 (e.g., as user response data 105A), and may later be uploaded via the network 102 to the surveyor server 113 when connectivity of the mobile device 103 to the network 102 is detected by the mobile survey application 101B.

In certain embodiments, the mobile survey application 101B enables a member of a research panel (e.g., an "opt-in" panelist) to:

View a list of available survey opportunities;
Take surveys on their mobile device (e.g., Smartphone), only requiring a connection to receive a mobile survey definition file 104B and send final response data 105A;
View rewards balance;
Redeem rewards;
View survey completion history;
Contact panel support;
View FAQ's, Terms and Conditions;
Update basic profile and contact information;
Recommend a friend; and
Comment on a social network.

In certain embodiments, a survey authoring tool 107 is implemented that provides a relatively simple system for authoring a survey definition 108 which can be exported (e.g., as an XML schema file) as a downloadable survey definition 104A. In certain embodiments, the survey authoring tool 107 may be a well-known, traditional authoring tool (like that of Confirmit), or it may provide an authoring environment that is similar to or consistent with a traditional web survey authoring tool's environment, such as that provided by Confirmit, for authoring a survey definition 108/104A. Of course, as discussed further herein, the survey authoring tool 107 may, in certain embodiments, generate a mobile survey definition 104A that includes instructions for employing certain optimal/preferred user interface elements and/or that excludes much extraneous information that is commonly included in an online web survey definition 108 that is generated by a traditional web survey authoring tool 107. As such, the author of survey authoring tool 107 may have the convenience of using a familiar type of authoring tool/interface, but the output of such tool may, in certain embodiments, be a mobile survey definition 104A that is more optimally geared toward deployment as a downloadable file for use on a mobile device 103.

In certain embodiments, a survey definition file 108 may be authored in a traditional web survey authoring application 107, such as that of Confirmit, which ensures compatibility with scripting standards and may maximize available scripter resource. The survey definition is then exported using the "Survey Definition" export feature to be downloaded to mobile device 103 (which process may generate an optimized mobile survey definition file 104A as discussed above).

In one embodiment, the survey definition authoring tool 107 allows the following question types and features along with a suggestion of which release version they are featured in.

| # | Feature |
|---|---------|
| 1 | Single code questions (SC) |
| 2 | Multi code questions (MC) |
| 3 | Info node/information screen |
| 4 | Open end questions (OE) |
| 5 | Numeric questions (NUM) |
| 6 | Grid questions (SC & MC horizontal and vertical enforcement) |
| 7 | Slider rating questions |
| 8 | Question routing (from SC and MC questions) |
| 9 | Display static graphical stimulus (jpg.gif) - in certain embodiments to aid the use of surveys by mobile survey application 101B without requiring persistent connection to network 102, the application 101B may cache images referenced in the survey definition 104A on the |

-continued

| # | Feature |
|---|---------|
|    | device 103 as part of downloading the survey definition (e.g., through tool 112) to mobile survey application 101B. |
| 10 | Display streamed video stimulus |
| 11 | Masking and piping |
| 12 | Status question - incomplete, SF, Complete |

In one embodiment, once the survey definition (or "questionnaire") has been scripted, tested and signed off it is exported to an XML file format. Questions and their elements are defined in this single file, the downloadable mobile survey definition 104A, which can be downloaded to a mobile device 103 and read/interpreted by a mobile survey application 101B (e.g., an iPhone App).

The mobile survey application 101B, in accordance with one embodiment, fulfils at least two roles: 1) to read and display surveys, record responses to these surveys and transfer this data back to a surveyor server device 113 (e.g., as uploaded response data 105B); and 2) to facilitate the respondent experience with details of rewards, FAQ's, contact, assistance and ability to update profile.

In one embodiment, when launched for the first time, the mobile survey application 101B opens a login screen. Once the first login has been completed the respondent's authentication token is stored and this screen is not displayed thereafter, in one embodiment.

In one embodiment, the main screen presented on the user interface of the mobile survey application 101B features a series of buttons allowing the respondent to complete surveys and access relevant information.

| # | Element | Where |
|---|---------|-------|
| 1 | Login screen | 1$^{st}$ screen |
| 2 | Start surveys | Button on main screen |
| 3 | Rewards | Button on main screen |
| 4 | Contact/assistance | Button on main screen |
| 5 | update profile | Button on main screen |
| 7 | FAQs | Information screen |
| 8 | Terms and conditions | Information screen |

Closing the mobile survey application 101B may be achieved, in one embodiment, by hitting a home button, such as the round "home" button found at the bottom of iPhone devices or similar mechanism available on other mobile devices.

A device manufacturer or service provider's online application store (e.g., the Apple App store) allows the mobile survey application 101B to easily be distributed in a well-known manner to a user's mobile device (e.g., iPhone, iPad, etc.). Of course, the mobile survey application 101B may instead or additionally be made available for download from various other app stores. Users can search for the application and install it to their mobile device 103 via communication network 102 in a few easy steps. A link can also be sent to respondents in a newsletter, email or webpage link to allow them to download the application direct from another application or website (e.g., iTunes, etc.). In one embodiment, the mobile survey application 101B installs with a unique respondent ID (subsid) allowing a surveyor to match their survey responses to respondent profiling data, for quality control checks and for demographic data appends, for example.

In one embodiment, when the mobile survey application 101B is opened on the user's mobile device 103, it attempts to check for survey definitions that are available for that respondent (from surveyor server 113). While a single server 113 is shown in the example of FIG. 1, in certain embodiments, there may be many server systems employed for implementing the various elements shown in FIG. 1, various survey definitions that may be available for download to users, as well as one or more database servers for storing demographics, profiling, and/or other information. The mobile survey application 101B then acts as a questionnaire viewer/user interface which allows respondents to open and complete questionnaires in accordance with the downloaded mobile survey definitions 104B that have been selected to be taken by the respondent.

Upon completion of the questionnaire/survey, the user's response data is typically desired to be sent to a surveyor's server 113. In one embodiment, when the respondent clicks the next button at the end of the survey, the mobile survey application 101B opens a connection via network 102 to a web service and transfers the response data 105A as an XML record to the intermediary web service. This batches responses and processes the data combines it with any required panel and profiling variable responses and passes this to the Confirmit data transfer web API, which pipes the data into the Confirmit installation of the surveyor's choice. While Confirmit is used in this example, an API for other surveyor hosting services may likewise be employed instead of or in addition to that of Confirmit.

If the mobile device 103 is unable to open a data network connection (e.g., Internet connection) to the surveyor's web services, the responses are stored on the mobile device 103 and the mobile survey application 101B periodically attempts to open a connection until such time as the connection can be established by mobile device 103 and the response data is transferred.

In one embodiment, the user's response data 105A can either be transferred to Confirmit and stored as Confirmit survey data (e.g., standard surveys for clients), or collated into a database (e.g., for panel profilers). The survey responses stored in Confirmit can be easily exported into standard data deliverable formats enabling data processing to work with the data seamlessly using existing systems and processes.

In one embodiment, a desired survey may be scripted in Confirmit using a standardized template that is developed to normal standards with a few specific instructions. To enable special question types, scripters specify the type using a keyword entered into the legacy Confirmit variable named "Category". Once the survey has been scripted, it may be quality control checked by the surveyor's project manager and/or the client desiring the survey to ensure that standards are met. The scripter then exports the survey definition XML file and provides this to the project manager.

In one embodiment, the project manager may set up a project and survey invite as they would a traditional survey project, selecting mobile survey (or "Smartphone survey") from the project type dropdown. This is done in certain embodiments by interacting with the survey authoring tool 107. Selecting this project type ("Smartphone survey") ensures that: 1) the Project Manager is shown an input field to upload the survey definition XML; and 2) the sample selection is automatically filtered to users on the mobile survey (e.g., Smartphone) panel of the surveyor. In one embodiment, users are automatically added to this profiler on the surveyor's server 113 when they log into the mobile survey application 101B for the first time.

In one embodiment, the Project manager then uploads (to the surveyor's server 113) the mobile survey definition file 104A and enters their sample definition detailing the composition and volume of respondents desired for the survey. Once the invite has been signed off the survey will appear in respondent survey listings provided on mobile device 103 by mobile survey application 101B.

Having been sampled as a respondent for a survey, new survey opportunities will be displayed on the home screen of the mobile survey application 101B, allowing respondents to download and take surveys within the application 101B. In certain embodiments, a web service (in which definition processing tool 112 is implemented in certain embodiments) on the surveyor's server 113 makes the survey(s) for which a given respondent is invited to take available for download to the respondent's mobile device 103.

In one embodiment, the panelist/user opens the mobile survey application 101B on mobile device 103, selects the survey they wish to take, and clicks on the entry matching this survey. The mobile survey application 101B calls the intermediary web service on the surveyor's server 113, which calls the relevant panel's web service for the survey definition file. In certain embodiments, the intermediary web service provides the functionality of mobile definition processing tool 112 to transform the XML file removing some unnecessary elements of the XML, minimizing the size of the survey definition file being downloaded to the mobile device and/or otherwise implement the appropriate user interface elements to be included in the downloaded mobile survey definition 104B.

In one embodiment, once the mobile survey definition 104B has been downloaded to the mobile device 103, the survey listing displays an icon to say that the survey has been downloaded. The survey definition 104B is now on the mobile device 103 and the survey can be completed without the need for an Internet connection. Whilst completing the survey, the respondent can close the mobile survey application 101B or click back to surveys using the "surveys" button at the top of the survey. The responses that have been input up to this point are stored on the mobile device 103, and the user can return to the survey at any point by clicking on the survey on the survey listing screen.

When the user completes the survey, the mobile survey application 101B opens a connection to the intermediary web service and transfers the data as an XML file to this web service. If there is no connection, the mobile survey application 101B will continue to poll the web service for a connection at regular intervals whenever the mobile survey application is open, in certain embodiments.

In one embodiment, when the survey response XML reaches the intermediary web service, it is passed over to the panel web service. The panel web service may carry out basic validation, the status for the survey is set (Complete, screening failure, etc), any panel profiling or demographics such as age, gender, region etc is added to the data and responses are batched into groups of five, for example. These survey responses are then, in certain embodiments, sent to the Confirmit Data transfer Web API which takes the data and feeds it into the relevant Confirmit survey. The data is now stored in the Confirmit server (or other survey engine/platform) and can be managed, exported and analysed using usual/traditional processes and systems, in certain embodiments.

In view of the above, certain embodiments of the present invention improve the flexibility of conducting surveys, particularly via mobile devices. Rather than being rigidly fixed to requiring a user's mobile device to have a persistent Internet connection in order to conduct a web-based survey that is being hosted by a web server (e.g., an online browser-based survey), for example, the mobile survey solution proposed herein permits a survey definition to be downloaded to a mobile device and then a mobile survey application executing on the mobile device can interpret the survey definition to allow the user to input responses without requiring a persistent network connection. Further, in certain embodiments, the user may interact with the survey periodically (e.g., over the course of several sessions), rather than being required to fully complete the survey in a single session. Once the survey is completed on the mobile device, the user's input response data can be uploaded (e.g., to a server device) when a network connection is detected for the mobile device. Thus, embodiments of the present invention enable survey definitions to be downloaded to a user's mobile device, conducting the survey via the mobile device, and uploading of the user's response data (e.g., to a server device) with intermittent connectivity to the Internet, rather than requiring a persistent connection throughout the survey process.

In addition, employing a mobile survey solution in accordance with an embodiment of the present invention opens further opportunities, particularly with regard to identifying profile and/or other characteristic information about the user of device 103. For instance, as discussed above, in certain embodiments a user may complete a user profile to provide certain demographic and/or other information about the user, which may then be used to determine which surveys the user is to be invited to participate (i.e., determining which surveys the user meets the target criteria defined for participating therein). In certain embodiments, mobile survey application 101B may collect further information regarding the user from the user's use of mobile device 103, which may in turn be used to update the user's profile (e.g., autonomously).

For instance, many mobile devices 103, such as cellular telephone devices, have location tracking capability (e.g., GPS functionality), and in certain embodiments mobile survey application 101B may leverage information about where the user goes with the mobile device 103 to update the user's profile information. For instance, information about the user's geographic locations that are visited, the roads that the user commonly travels, etc. may be gathered by mobile survey application 101B autonomously through its gathering of such information from location tracking logic that is implemented within mobile device 103, and the user's profile information may be updated by mobile survey application 101B to reflect this information about the user, which may then be used (e.g., by surveyor server 113) in determining which surveys the user should be selected to participate in. In certain embodiments, the mobile survey application 101B may be used for location-based analytics without the requirement for a survey; and so it may report, for instance, on behavior, segment behavior, and form profiling variables based upon geographic coordinates as opposed to survey responses.

As another example, in some instances, a mobile device 103 may be used for shopping and/or for payment of certain products/services by the user. In certain embodiments, information about the user's shopping habits and/or products/services purchased may be gathered by mobile survey application 101B autonomously through its gathering of such information from a shopping or payment application employed on mobile device 103, and the user's profile information may be updated by mobile survey application 101B to reflect this information about the user, which may then be used (e.g., by surveyor server 113) in determining which surveys the user should be selected to participate in. In certain embodiments, the mobile survey application 101B may allow respondents to scan product barcodes or store receipts (e.g., via a scanner of mobile device 103) to log purchases, and such information may be included in the user's profile.

While the concepts described above are focused on conducting a survey, it should be recognized that the concepts of the present invention may likewise be readily employed for gathering other types of information from a user of a mobile device. Thus, embodiments of the present invention are not limited in application solely to conducting surveys. Instead, various other types of mobile applications may be downloaded to a mobile device, which may be executable to gather information from a user of the mobile device (e.g., in accordance with a data gathering definition/scheme that is specified by a downloaded definition file that can be interpreted by the mobile device), in a manner similar to that discussed above for mobile survey application 101B executing to interpret mobile survey definition 104B for gathering data from a user of mobile device 103.

Also, while the concepts disclosed herein are particularly advantageous and desirable for mobile devices, the concepts are not limited in application to a device that is readily and/or easily transportable by a user (e.g., handheld devices, etc.) but may likewise be employed for panelist devices that are not readily/easily "mobile," wherein the downloadable and locally-residing/executing survey application and survey definition file enables a survey to be conducted on such non-mobile devices without requiring persistent network connectivity to be maintained, as is traditionally required for web-based surveys. For instance, such non-mobile devices may not have battery power (and thus may not be mobile because of the tethered power cord) and/or such non-mobile devices may not have wireless network connectivity capability (and thus may not be mobile because of the tethered network connection cable), as examples. Again, the embodiments disclosed herein above may likewise be implemented for conducting surveys with panelists via such non-mobile devices. For instance, the exemplary embodiments described above with reference to the exemplary mobile device 103 of FIG. 1 may likewise be employed for implementations where a panelist's device 103 is instead a non-mobile device, where the mobile survey application 101B and survey definition file 104B reside and execute locally on such non-mobile device as described above for the mobile device 103.

Many of the elements described herein, when implemented via computer-executable instructions, are in essence the software code defining the operations thereof. For instance, the above-described mobile definition processing tool 112, survey authoring tool 107, and mobile survey application 101A/101B each may comprise computer-executable software code that is stored to a computer-readable medium and is executed by a processor-based computing device (e.g., server device 113 and/or mobile device 103) for performing the corresponding operations described herein. Further, the various operations described herein, such as those operations described with reference to the exemplary flow of FIG. 2, as well as other operations described herein may be performed by computer-executable software code stored to a computer-readable medium and executing on a processor-based computing device. The executable instructions or software code may be obtained, for example, from a computer-readable medium or "storage device" (e.g., a hard drive media, optical media, EPROM, EEPROM, tape media, cartridge media, flash memory, ROM, memory stick, and/or the like). In certain embodiments, a CPU of a computing system or device may execute the various logical instructions according to embodiments of the present invention. For example, CPUs of server device(s) 113 and mobile device(s) 103 may execute machine-level instructions according to the exemplary operational flow described above in conjunction with FIG. 2. It shall be appreciated that the present invention is not limited to the architecture of the computing system or device on which the various elements are implemented, such as any particular architecture of a server device 113 or a mobile device 103. The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein, as examples. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for conducting a survey comprising:
    generating a survey definition file that is downloadable to a user's processor-based device for interpretation by a survey application executing on the processor-based device to conduct a survey of a user of the processor-based device, wherein said generating comprises:
    receiving, as input to a definition processing tool, a predefined survey definition file; and
    processing, by the definition processing tool, the received predefined survey definition file to generate the survey definition file for download to the user's processor-based device;
    wherein said processing comprises:
    removing certain information from the received predefined survey definition file;
    wherein said removing comprises:
    removing unused question variables, variables describing features not used in a downloaded survey, logic and/or scripting not supported on the processor-based device, formatting instructions and/or tags not required for a non-browser based survey, legacy variables from an earlier version of an authoring tool used to create the predefined survey definition file, survey variables not supported by the survey application on the processor-based device, and variable setting scripts;
    downloading from a server device, via a communication network, the survey definition file to the processor-based device; and
    receiving from the processor-based device, via the communication network, at a server device response data reflecting the user's input to the processor-based device for the survey,
    responsive to completion of the survey by the user, determining by the survey application whether the processor-based device is communicatively connected to the communication network; and
    when determined by the survey application that the processor-based device is not communicatively connected to the communication network, periodically checking by the survey application whether the processor-based device is communicatively connected to the communication network, and
    when determined by the survey application that the processor-based device is communicatively connected to the communication network, uploading the response data from the processor-based device to the server device.

2. The method of claim 1 wherein the user's processor-based device is a mobile device that is operable to wirelessly connect with said communication network.

3. The method of claim 1 further comprising:
    said survey application executing on the processor-based device interprets the downloaded survey definition file to present a user interface on the processor-based device for conducting the survey as defined by the downloaded survey definition file.

4. The method of claim 3 further comprising: storing response data reflecting the user's input to the processor-based device for the survey locally on the processor-based device.

5. The method of claim 1 wherein persistent connectivity of the user's processor-based device with the communication network is not required for the user to interact with the survey application executing on the processor-based device for taking the survey, and wherein response data reflecting the user's input to the processor-based device for the survey is stored locally on the user's processor-based device.

6. The method of claim 1 wherein the survey definition file specifies at least one of the following: specific questions to be asked; specific answer types and/or choices that to presented for selection in response to a question; and specific survey flow and/or dependent relationship between questions and/or answers.

7. The method of claim 1 wherein said generating comprises:
    receiving user input to a survey authoring tool specifying information about a desired survey; and generating, by said survey authoring tool, the survey definition file.

8. The method of claim 1 wherein said processing comprises:
    determining whether the received predefined survey definition file specifies certain user interface elements that are not preferred for conducting a survey locally on the user's mobile processor-based device; and replacing any determined user interface elements that are not preferred with a preferred user interface element in the survey definition file that is downloaded to the mobile processor-based device.

9. The method of claim 1 wherein the received predefined survey definition file defines a survey for a different delivery platform, other than a downloadable survey definition file for a user's processor-based device.

10. The method of claim 9 wherein the received predefined survey definition file defines a web-based survey to be hosted by a web server.

11. The method of claim 1 further comprising: receiving from the user's processor-based device, via the communication network, at the server device user behavior information collected by the survey application, where the behavior information is not expressly input to the survey application by the user.

12. A mobile survey application comprising non-transitory computer-executable software code stored to a non-transitory computer-readable medium, which when executed by a mobile processor-based device causes the device to perform a method comprising:
    interpreting a predefined mobile survey definition file stored locally on the mobile processor-based device, said interpreting comprising removing information from said predefined mobile survey definition file;
    wherein said removing comprises:
    removing unused question variables, variables describing features not used in a downloaded survey, logic and/or scripting not supported on the processor-based device, formatting instructions and/or tags not required for a non-browser based survey, legacy variables from an earlier version of an authoring tool used to create the predefined survey definition file, survey variables not supported by the survey application on the processor-based device, and variable setting scripts;
    presenting a user interface on the mobile processor-based device for conducting a survey of a user of the mobile processor-based device as defined by the mobile survey definition file;
    receiving input to the user interface from the user;
    storing locally on the mobile processor-based device response data reflecting the received user's input for the survey;
    responsive to completion of the survey by the user, determining whether the mobile processor-based device is communicatively connected to a communication network, and
    when determined that the mobile processor-based device is not communicatively connected to the communication network, periodically checking whether the mobile processor-based device is communicatively connected to the communication network, and
    when determined that the mobile processor-based device is communicatively connected to the communication network, uploading the response data from the mobile processor-based device to a server device.

13. The mobile survey application of claim 12, wherein the mobile survey definition file specifies at least one of the following: specific questions to be asked in the user interface; specific answer types and/or choices that to presented in the user interface for selection in response to a question; and specific survey flow and/or dependent relationship between questions and/or answers.

14. The mobile survey application of claim 12, wherein the method further comprises: determining available surveys for which the user of the mobile processor-based device is invited to participate; presenting a user interface on the mobile processor-based device for identifying the determined available surveys and enabling the user to select any one or more of the surveys to take; and
    responsive to receiving user input selecting one of the determined available surveys to take, downloading a corresponding mobile survey definition file via the communication network from a server device to the mobile processor-based device.

15. A method comprising:
    receiving, as input to a mobile definition processing tool, a predefined survey definition file; and processing, by the mobile definition processing tool, the received predefined survey definition file to generate a mobile survey definition file that is downloadable, via a communication network, to a mobile processor-based device and that includes information that is interpretable by a mobile survey application executing on the mobile processor-based device to present a user interface on the mobile processor-based device for conducting a survey of a user of the mobile processor-based device as defined by the information in the mobile survey definition file;
    wherein said processing comprises removing certain information from the received predefined survey definition file;
    wherein said removing comprises:
    removing unused question variables, variables describing features not used in a downloaded survey, logic and/or scripting not supported on the processor-based device, formatting instructions and/or tags not required for a non-browser based survey, legacy variables from an earlier version of an authoring tool used to create the predefined survey definition file, survey variables not supported by the survey application on the processor-based device, and variable setting scripts;
    downloading from a server device, via a communication network, the survey definition file to the processor-based device; and
    receiving from the processor-based device, via the communication network, at a server device response data reflecting the user's input to the processor-based device for the survey,
    responsive to completion of the survey by the user, determining by the survey application whether the processor-based device is communicatively connected to the communication network; and
    when determined by the survey application that the processor-based device is not communicatively connected to the communication network, periodically checking by the survey application whether the processor-based device is communicatively connected to the communication network, and
    when determined by the survey application that the processor-based device is communicatively connected to the communication network, uploading the response data from the processor-based device to the server device.

16. The method of claim 15 wherein said processing comprises: determining whether the received predefined survey definition file specifies certain user interface elements that are not preferred for conducting a mobile survey via the mobile processor-based device; and replacing any determined user interface elements that are not preferred with a preferred user interface element in the mobile survey definition file.

17. The method of claim 15 wherein the received predefined survey definition file defines a survey for a different delivery platform, other than a downloadable survey definition file for a mobile processor-based device.

18. The method of claim 17 wherein the received predefined survey definition file defines a web-based survey to be hosted by a web server.

* * * * *